United States Patent [19]

Brozovic

[11] Patent Number: 5,110,160
[45] Date of Patent: May 5, 1992

[54] HIGH PRESSURE PORT FITTING SYSTEM

[75] Inventor: Darko Brozovic, Richmond Heights, Ohio

[73] Assignee: Fluid Line Products, Inc., Willoughby, Ohio

[21] Appl. No.: 572,124

[22] Filed: Aug. 23, 1990

[51] Int. Cl.5 ............................................ F16L 41/14
[52] U.S. Cl. ................................ 285/211; 285/334.4; 285/351; 285/353; 285/321
[58] Field of Search ...................... 285/334.4, 353, 220, 285/211, 212, 332, 351, 321, 384, 385, 386, 387, 388

[56]  References Cited

U.S. PATENT DOCUMENTS

| | | | |
|---|---|---|---|
| 3,395,934 | 8/1968 | Rosén et al. | 285/351 X |
| 4,431,218 | 2/1984 | Paul et al. | 285/351 X |
| 4,690,436 | 9/1987 | Hehl | 285/353 X |
| 4,736,967 | 4/1988 | Mott et al. | 285/334 X |
| 4,754,995 | 7/1988 | Takahashi et al. | 285/351 X |

Primary Examiner—Dave W. Arola
Attorney, Agent, or Firm—Fay, Sharpe, Beall, Fagan, Minnich & McKee

[57]  ABSTRACT

A high pressure fitting system includes a body having a passage therethrough to provide fluid communication between an associated fluid system and a female port. The body includes a first groove adapted to receive a seal member that defines a primary seal when inserted in the female port. A frusto-conical portion on the body cooperates with a frusto-conical region of the female port to define a secondary metal-to-metal seal. A second groove in the body receives a pressure transfer ring which is partially captured by a fastening sleeve freely received around the body. Rotation of the fastening sleeve results in axial advancement of the male fitting assembly via the pressure transfer ring to establish the secondary seal.

19 Claims, 2 Drawing Sheets 5,110,160

HIGH PRESSURE PORT FITTING SYSTEM

BACKGROUND OF THE INVENTION

This invention pertains to the art of high pressure fluid systems and more particularly to high pressure port fitting systems that connect various fluid system components.

The invention is particularly applicable to a port fitting system that interconnects pressurized tubes, pipes or conduits with related fluid system components such as valves, pumps, or the like. However, it will be appreciated that the invention has broader applications and may be advantageously employed in still other fluid environments and applications.

Pressurized fluid systems all have the primary objective of conveying pressurized fluid from one point to another without developing any leak paths. Two well known structural arrangements are used to interconnect various components of a fluid system without resulting in any significant leakage problems.

According to the first arrangement, pipe threads that interconnect a fluid line with another component maintain a close enough tolerance to seal or close off any potential leak paths. Unfortunately, using the pipe threads as the seal element encounters difficulties under various conditions. For example at higher pressures, leakage may occur along the threads and oftentimes requires the addition of special sealing compounds such as the well known use of Teflon tape. Reliance on the threads of the fitting for sealing can also result in extensive swelling of the associated female port. The distortion of the female port, in turn, adversely effects close tolerances maintained on adjacent hydraulic components such as valve spools, plungers, and the like. Yet another problem associated with reliance on the pipe threads for sealing capabilities is the limited adjustability of the assembly.

According to the second system, a fitting incorporates an elastomeric O-ring for sealing purposes. In this arrangement, the fitting is defined by a straight boss that is adjustable because of the use of the sealing O-ring. Although this may resolve some of the adjustability problems encountered with a fitting that relies on the pipe thread for sealing purposes, it is not deemed to be applicable to higher pressures. The diameter of undercut of the threaded boss fitting determines the effective pressure area. Therefore to reduce the forces imposed on the fitting, it becomes necessary to reduce the thread size. This leads to a weaker cross-section of the fitting body because the fluid passageway must be maintained for predetermined flow requirements. Thus, although it may appear that merely increasing the undercut diameter and thread size would provide sufficient strength to the arrangement, it necessarily results in an increased area on which the pressure acts. Thus, a mere increase in size results in an increased force that tends to urge the fitting from the associated port.

It has thus been deemed desirable to provide a port fitting assembly that eliminates the swelling problems associated with some arrangements, can handle higher pressures, and yet is simple, reliable, and effective.

SUMMARY OF THE INVENTION

The present invention is directed to a new and improved fluid fitting system that overcomes all of the above referred to problems in a simple, economical manner.

According to the subject invention, the high pressure fluid fitting system includes a male fitting assembly having a body with a peripheral groove adjacent one end. The groove is adapted to receive a seal member therein. Further, a frusto-conical portion is axially interposed between the groove and the opposite end of the body. Additionally, a fastening sleeve is freely received over the body and cooperates therewith to urge the body into an associated female port. The port includes a first counterbore that closely receives the seal member and a second counterbore for receiving the fastening sleeve. The frusto-conical portion cooperates with a frusto-conical region in the port.

According to a more limited aspect of the invention, a second groove is formed in the body and receives a ring that is at least partially captured by the fastening sleeve.

According to still another aspect of the invention, the second groove is disposed on an opposite axial side of the frusto-conical portion from the first groove.

According to a still further aspect of the invention, the body frusto-conical portion and frusto-conical region of the port engage with one another along less than a full circumference at finger-tight makeup of the fitting and engage one another along the entire circumference upon complete makeup of the fitting system.

A principal advantage of the invention is the ability of the fitting system to handle high pressures.

Another advantage of the invention resides in the dual seal arrangement.

Yet another advantage of the invention is found in the simple, reliable and cost effective manner of addressing prior art problems.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE PREFERRED EMBODIMENT

Figure 2:
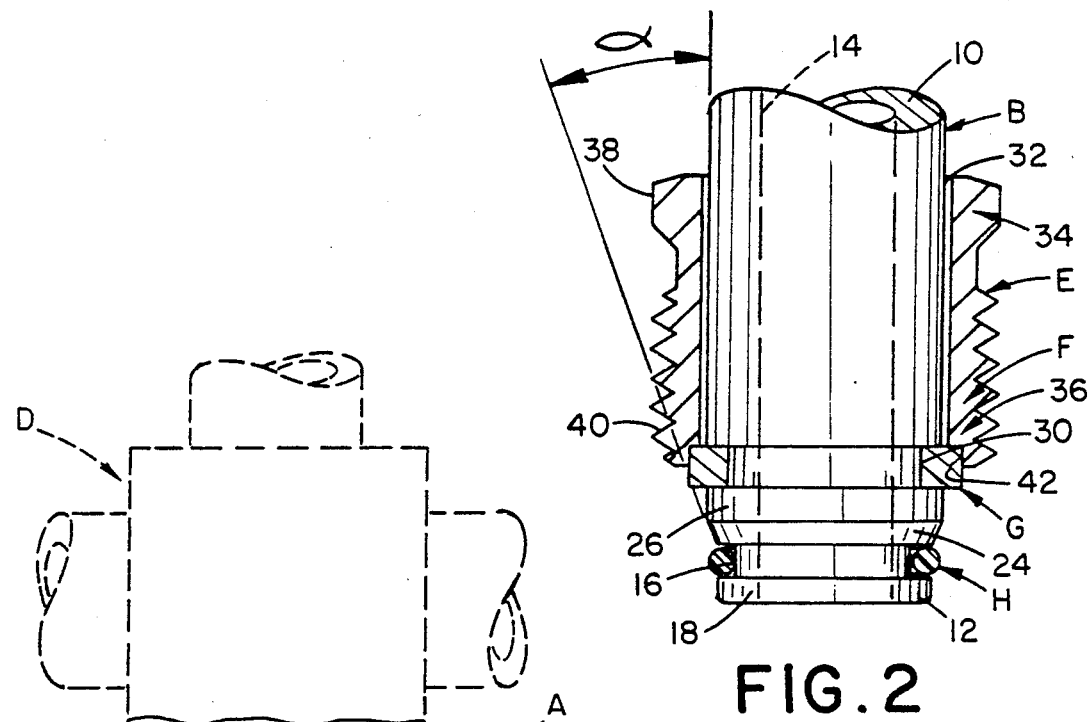
FIG. 2 is an enlarged elevational view of the fitting assembly with selected portions shown in cross-section.

Referring now to the drawings wherein the showings are for purposes of illustrating the preferred embodiment of the invention only and not for purposes of limiting same, the FIGURES show a high pressure port fitting system A that includes a male fitting assembly B received in an associated female port C. The male fitting assembly is connected to an external fluid system through an associated fluid component D (shown in phantom) such as a tee or cross fitting configuration. The male fitting assembly includes a body E, fastening sleeve F, pressure transfer ring G, and seal member H.

Figure 1:
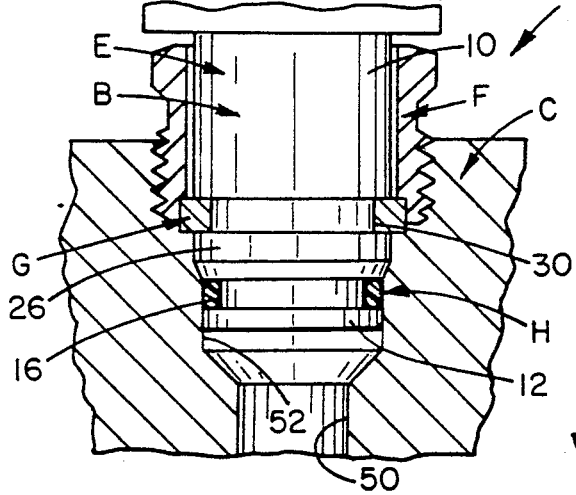
FIG. 1 is a side elevational view of the subject fitting system with selected portions shown in cross-section and an associated fluid component shown in phantom.
Figure 3:
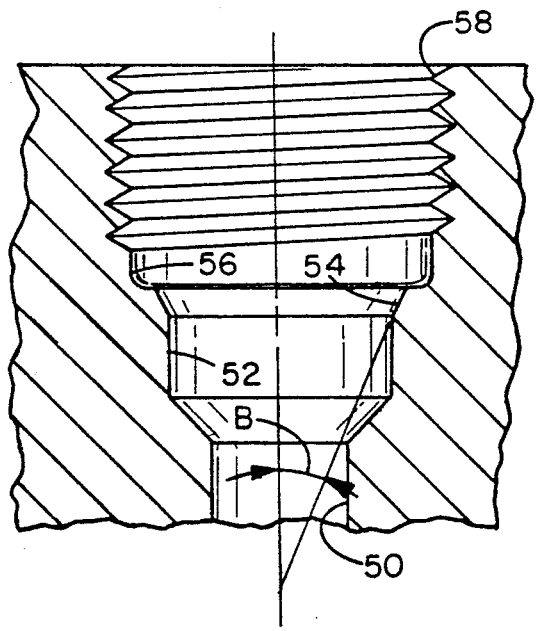
FIG. 3 is an enlarged cross-sectional view of an associated female port adapted to receive the fitting assembly of FIG. 2.

More particularly and with reference to FIGS. 1-3, the body includes opposed first and second ends 10, 12. The first end is secured to the remainder of a fluid system, such as the illustrated cross fitting, through any conventional means. The second end 12 of the body, on the other hand, is adapted for receipt in the female port C. A passage or bore 14 extends entirely through the body from the first end to the second end to establish fluid communication between the fluid system and the port. The port may, in turn, be in fluid communication with another fluid system component.

Adjacent the second end of the body, a first groove 16 is formed in a reduced first diameter portion 18 of the body. As illustrated, the first groove is dimensioned to receive an elastomeric seal member H such as an O-ring. The groove and O-ring are sized so that a peripheral portion of the O-ring extends radially outward beyond the first diameter portion for selective, sealing engagement with the female port and as will be described in further detail below.

Extending axially inward from the first groove and toward the first end of the body, a frusto-conical portion 24 alters the external diametrical dimension of the body from the first portion 18 to land 26 having a second diameter greater than that of the first portion 18. Preferably, the frusto-conical portion forms an angle alpha ($\alpha$) with the longitudinal axis of the body on the order of approximately 20° to 25° and a specific tolerance on the order of plus 0° and minus $\frac{1}{2}$°. The frusto-conical portion cooperates with a similar frusto-conical region of the female port as will be described in further detail below.

A second groove 30 is located between the frusto-conical portion and the first end of the body. The second groove is adapted to closely receive the pressure transfer ring G. As clearly illustrated in the drawings, the pressure transfer ring has a generally rectangular or square cross-section for mating receipt in the second groove, but the second groove has a radial dimension that only partially captures the transfer ring. In other words, the radial outer portion of the transfer ring extends outwardly from the body for cooperative engagement with the fastening sleeve F. Preferably, the pressure transfer ring is defined as a split member, such as semicircular portions that are clinched together, that is heat treated to increase its strength. The cross-sectional configuration of the transfer ring transmits forces from the fastening sleeve, through the ring, and to the body in directions only parallel to the axis of the body.

The fastening sleeve F includes bore 32 that extends from an upper or first end 34 to a second or lower end 36. Preferably, the first end includes tool engaging surfaces such as wrench flats 38 on an external portion that permit the fastening sleeve to be manipulated by a wrench or similar tool. At the second end of the fastening sleeve is provided an external threaded region 40 that cooperates with the female port for advancing the male fitting assembly therein. Additionally, a small recess or counterbore 42 is defined at the second end to abuttingly engage and radially capture the outer portion of the pressure transfer ring.

The structural arrangement of the associated female port C is best illustrated in FIG. 3. It includes a through passage or bore 50 that has a diameter closely approximating that of the passage 14 through the body. The passage 50 opens out into an enlarged diameter portion 52 that closely receives the first portion 18 of the male fitting assembly. Additionally, a frusto-conical region 54 tapers radially outward as it extends axially toward counterbore 56. The counterbore is itself threaded at 58 to threadably receive the external threads of the fastening sleeve.

Figure 4:
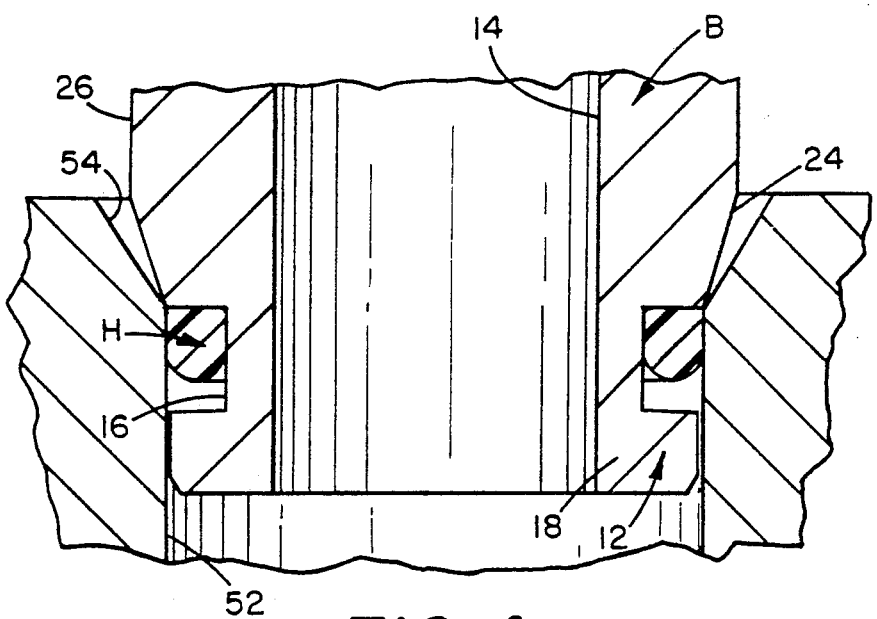
FIG. 4 is an enlarged detailed view illustrating initial makeup of the fitting assembly in the associated port.
Figure 5:
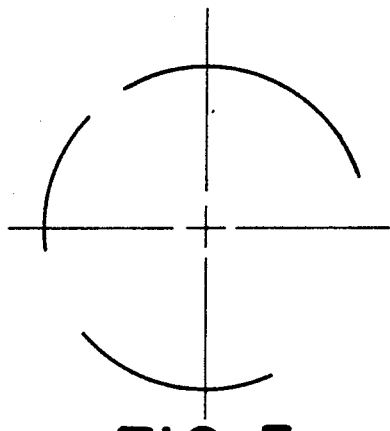
FIG. 5 is a schematic representation of the circumferential engagement between the fitting assembly and associated port at initial makeup.
Figure 6:
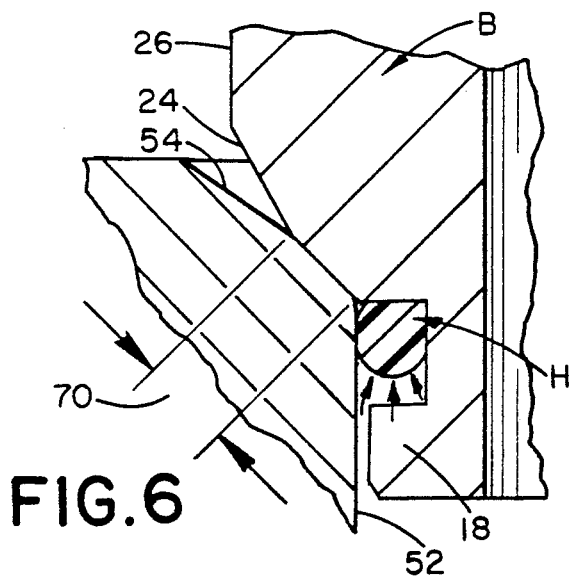
FIG. 6 is an enlarged detailed view of the fitting assembly and port upon complete makeup of the assembly.
Figure 7:
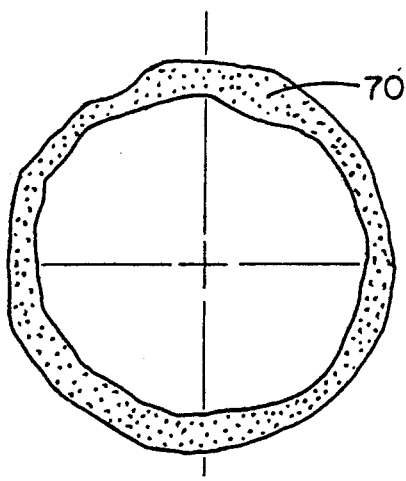
FIG. 7 is a schematic representation of the circumferential engagement of the fitting assembly and port of FIG. 6; and, FIG. 8 illustrates a common, prior art problem of seal member extrusion.

The male fitting assembly is inserted into the associated female port by directing the body second end 12 into the enlarged diameter portion 52 of the female port passage. As most apparent in FIG. 4, the frusto-conical region 54 of the female port defines an angle beta ($\beta$) of approximately $22\frac{1}{2}$° to 25° with a specific tolerance on the order of plus 0° and minus $\frac{1}{2}$°. Thus, upon finger-tight makeup of the fitting assembly in the port, the frusto-conical portion of the body circumferentially engages the frusto-conical region 54 along approximately 270° (FIG. 5). Thereafter, the fastening sleeve is rotated by an associated tool and advanced axially inward, along with the remainder of the male fitting assembly. This results in deformation or cold forging of the frusto-conical portion and frusto-conical region into an annular contact area 70 as illustrated in FIGS. 6 and 7. It is to be understood that the body is only axially advanced and essentially does not rotate during makeup of the fitting system due to the free receipt of the fastening sleeve thereover. The body, though, can be rotated relative to the port as desired prior to final makeup of the fitting assembly.

Figure 8:
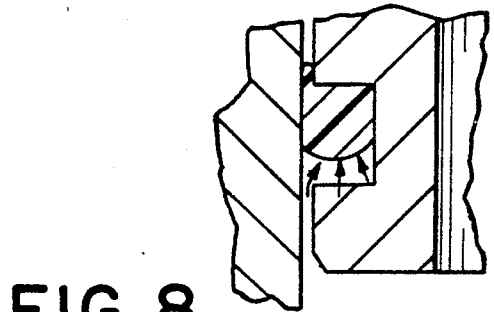

The deformation of the frusto-conical portion with the frusto-conical region defines a secondary, metal-to-metal seal disposed axially outward from the primary O-ring seal. Additionally, the engagement of these frusto-conical surfaces begins at the intersection of the first groove 16 in the body with the frusto-conical portion 24. Thus, extrusion of the O-ring in high pressure situations is not possible. That is, the common, prior art structural arrangement resulted in extrusion problems as illustrated in FIG. 8. High pressure in the prior art structures extrudes a portion of the O-ring axially along the gap defined between the fitting body and female port. With the subject invention, this extrusion problem is overcome since the gap is eliminated by the secondary metal-to-metal seal. Test results indicate that working pressures in excess of 5,000 PSI are effectively handled by the described port fitting system.

The invention has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A high pressure fitting assembly comprising:

a body having a fluid passage extending therethrough from a first end to a second end, the body including a first peripheral groove adjacent the second end for receiving a seal member therein, and a frusto-conical portion axially interposed between the groove and first end;

a fastening sleeve received over the body and being operatively associated therewith, the sleeve being externally threaded along a portion thereof; and a port having a bore adapted to communicate with the fluid passage of the body, a smooth walled first counterbore for closely receiving the body second end and seal member therein, a threaded second counterbore for receiving the fastening sleeve in threaded engagement and securing the body in the port, and a frusto-conical region interconnecting the first and second counterbores being dimensioned for sealing engagement with the frusto-conical portion of the body.

2. The high pressure fitting assembly as defined in claim 1 further comprising a second peripheral groove axially spaced from the first groove for receiving a ring therein that operatively interconnects the fastening sleeve and body.

3. The high pressure fitting assembly as defined in claim 2 wherein the second groove is disposed on an opposite axial side of the frusto-conical portion from the first groove.

4. The high pressure fitting assembly as defined in claim 2 wherein the ring is at least partially captured in the fastening sleeve.

5. The high pressure fitting assembly as defined in claim 2 wherein the ring has a generally rectangular cross-section for transmitting only axial forces between the body and fastening sleeve generally parallel to an axis of the bore.

6. The high pressure fitting assembly as defined in claim 1 wherein the fastening sleeve is radially spaced from the body along its axial extent for permitting selective orientation of the body prior to final makeup of the fitting assembly.

7. The high pressure fitting assembly as defined in claim 1 wherein the frusto-conical portion and frusto-conical region engage one another along less than a full circumference at finger-tight makeup of the fitting assembly and engage one another along the entire circumference upon complete makeup of the fitting assembly.

8. The high pressure fitting assembly as defined in claim 1 wherein the frusto-conical portion of the body and frusto-conical region of the port angle radially inward approximately 20° to 25° as they extend axially.

9. The high pressure fitting assembly as defined in claim 1 wherein the minimal dimension of the frusto-conical portion terminates at the first peripheral groove.

10. A high pressure fitting assembly comprising:
a body having a fluid passage extending generally along an axis from a first end to a second end, the body including a first peripheral groove adjacent the second end for receiving a seal member therein, a second peripheral groove spaced axially from the first groove, and a frusto-conical portion axially interposed between the first and second grooves;

a ring having a generally rectangular cross-section received in the second groove and extending radially outward from the body;

a fastening sleeve received over the body and being radially spaced therefrom along its axial extent to permit the body to be selectively oriented before final makeup of the fitting assembly, the sleeve being externally threaded along a portion thereof and including a groove for at least partially capturing the ring therein and transmitting forces from the fastening sleeve to the body in a direction generally parallel to the axis; and, a port having a bore adapted to communicate with the fluid passage of the body, a first counterbore for closely receiving the body second end therein, a threaded second counterbore for threadedly receiving the fastening sleeve therein, and a frusto-conical region interconnecting the first and second counterbores and being dimensioned to sealingly engage the frusto-conical portion of the body.

11. The high pressure fitting assembly as defined in claim 10 wherein the frusto-conical region in the port angles radially inward approximately 22.5° to 25° as it extends axially from the second to the first counterbore.

12. The high pressure fitting assembly as defined in claim 11 wherein the frusto-conical portion of the body angles radially inward approximately 20° to 25° as it extends axially from the first end to the second end.

13. The high pressure fitting assembly as defined in claim 10 wherein the frusto-conical portion of the body angles radially inward approximately 20° to 25° as it extends axially from the first end to the second end.

14. The high pressure fitting assembly as defined in claim 10 wherein the ring is defined by first and second semicircular portions.

15. The high pressure fitting assembly as defined in claim 10 wherein the minimal dimension of the frusto-conical portion terminates at the first peripheral groove.

16. A fitting assembly comprising:
a body having a fluid passage extending therethrough from a first end to a second end, the body including a first groove adjacent the second end for receiving a seal member therein, a second groove axially spaced from the first groove, and a generally frusto-conical portion axially interposed between the first and second grooves, the frusto-conical portion extending radially outward as the body extends axially from the first groove toward the second groove;

a fastening sleeve having an enlarged throughbore for receipt over the body, the fastening sleeve having external threads along a portion thereof, and further including a recess;

a ring having a generally rectangular cross-section being at least partially received in the second groove of the body and the recess of the fastening sleeve for transmitting forces from the fastening sleeve to the body; and, a port having a bore for communication with the fluid passage, a smooth walled first counterbore closely receiving the body second end and seal member therein, a threaded second counterbore operatively engaging the fastening sleeve threads for securing the body to the port and a frusto-conical region dimensioned for sealing, metal-to-metal engagement with the frusto-conical portion of the body and for limiting extrusion of the seal member during high pressure conditions.

17. The high pressure fitting assembly as defined in claim 16 wherein the frusto-conical region in the port angles radially inward approximately 22.5° to 25° as it extends axially from the second to the first counterbore.

18. The high pressure fitting assembly as defined in claim 17 wherein the frusto-conical portion of the body angles radially inward approximately 20° to 25° as it extends axially from the first end to the second end.

19. The high pressure fitting assembly as defined in claim 16 wherein the frusto-conical portion of the body angles radially inward approximately 20° to 25° as it extends axially from the first end to the second end.

* * * * *